Oct. 28, 1969  W. T. OVERHULSER  3,475,049

PICK-UP CAMPER MOUNTING MEANS

Filed Nov. 9, 1967

*INVENTOR.*
WILLIAM T. OVERHULSER
BY
M. A. Hobbs
ATTORNEY

# United States Patent Office 3,475,049
Patented Oct. 28, 1969

3,475,049
PICK-UP CAMPER MOUNTING MEANS
William T. Overhulser, Elkhart, Ind., assignor to
Gladding Corporation, New York, N.Y.
Filed Nov. 9, 1967, Ser. No. 681,852
Int. Cl. B60p 3/32; B65j 1/22
U.S. Cl. 296—23   10 Claims

ABSTRACT OF THE DISCLOSURE

A camper hold-down means for use with a pick-up truck bed in which one or more fixtures are used at the forward end of the bed and having interlocking projections and slots for holding the front end of said camper firmly in position in the bed, and one or more fixtures are used adjacent the rear of the bed for drawing the camper down firmly onto the bed and holding it in fixed position thereon.

---

In the conventional pick-up truck camper, a body or compartment is mounted on the truck bed and secured in place by bolts or other types of fixtures connected to the sides of the bed. Since the camper is often removed from the truck bed to permit the truck to be used for general hauling, the fixtures are normally easy to reach for securing and releasing the camper when the camper is mounted on or removed from the bed. However, in the past, difficulty has been encountered in providing a fixture which could be easily reached and manipulated and was still sufficiently strong and reliable to hold the camper firmly in place on the bed throughout all operating conditions of the truck. Further, in order to provide the required strength, fixtures have been used which are bulky or protrude from the sides of the vehicle and require the drilling of a number of holes which are readily visible when the fixtures are removed and which result in damage to the bed sides as the securing bolts work in the holes while the truck is being driven. The relatively thin sheet metal sides through which the bolts extend permit the bolts to become loose, thus permitting the camper to jostle on the bed and requiring frequent tightening of the bolts holding the fixtures, or tightening of the links connecting the fixtures to the camper. It is therefore one of the principal objects of the invention to provide a fixture means for securing a camper to a pick-up truck, which can be firmly and permanently attached to the truck bed and which can be left on the truck bed when the camper has been removed without interfering with the normal use of the bed for general hauling.

Another object of the invention is to provide a fixture for pick-up campers, which can be effectively and reliably secured to the truck bed so that any normal use of the truck will not result in loosening of the camper, and which is so constructed and arranged that the camper can easily be mounted on the truck bed and secured thereto using easily accessible fixture means for holding the camper rigidly in place.

Still another object of the invention is to provide a simple and strong fixture means for attaching a camper to a pack-up truck, which is not easily visible after the camper has been mounted on the truck, and which can be removed from the truck without leaving any conspicuous holes or permanent bed alterations.

Additional objects and advantages of the invention will become apparent from the following description and accompanying drawing, wherein.

Figure 1:
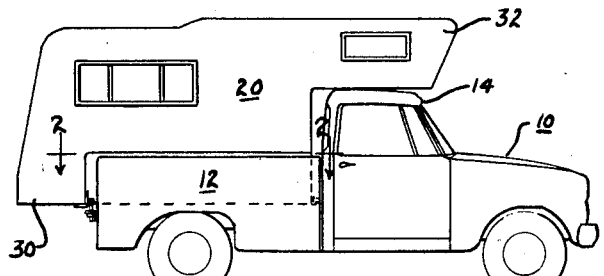
FIGURE 1 is a side elevational view of the pick-up truck showing a camper mounted thereon and held in place by the present hold-down fixture means.
Figure 2:
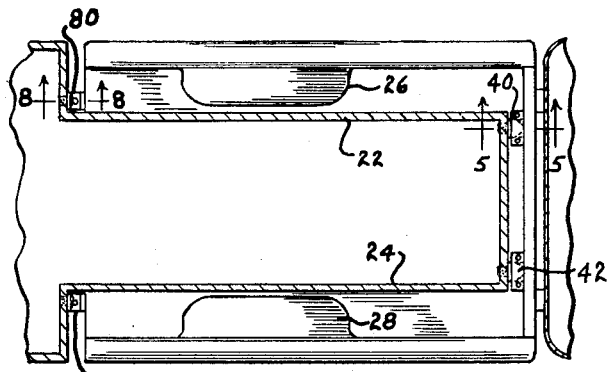
FIGURE 2 is a horizontal cross sectional view of a portion of a camper and truck, the section being taken on line 2—2 of FIGURE 1.
Figure 7:
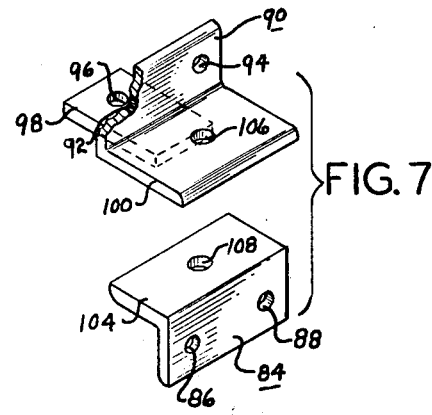
FIGURE 7 is an enlarged perspective view of another fixture of the present camper hold-down means, with a portion of one part being broken away to better illustrate the construction of the fixture.

Referring more specifically to the drawing, numeral 10 designates generally a pick-up truck having a bed 12 and a cab 14. For the purpose of the present description, the vehicle may be considered as a conventional pick-up truck having a bed thereon with low sides and a pivoted and removable tailgate (not shown). Numeral 20 designates a pick-up camper, which for the purpose of the invention may be considered conventional, and which has recessed sides 22 and 24 to provide slots on opposite sides thereof for receiving wheel wells 26 and 28 of the truck. In the drawings shown in FIGURES 1 and 2, the tailgate of the truck has been removed and the camper is provided with rear extension 30 projecting outwardly from the rear of the truck and a forward extension 32 projecting over cab 14. The particular configuration, including such features as windows, doors and ventilators, is not considered important to the present invention, and various changes may be made in the camper design without interfering with the proper use of the present hold-down means. The present hold-down means may be used with truck beds of various capacities such as one-half, three-quarters and one ton sizes.

Figure 3:
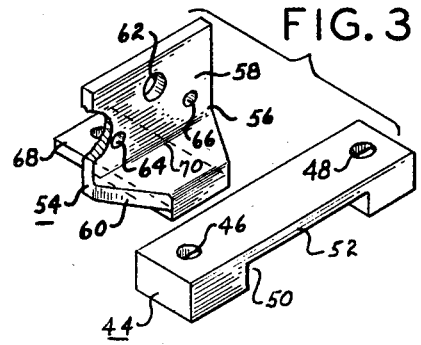
FIGURE 3 is an enlarged perspective view of one of the fixtures of the present camper hold-down means, a portion of one part thereof being broken away in order to better illustrate the construction of the fixture.

The present hold-down means includes two identical fixtures indicated by numerals 40 and 42 attached to the floor of bed 12 in the front end thereof, preferably against the front wall of the bed. The details of the fixtures 40 and 42 are best illustrated in FIGURE 3, each fixture consisting of part 44 which is attached to the floor of the bed by bolts extending through holes 46 and 48. The fixture contains a rectangularly shaped slot 50 extending transversely through part 44 and being defined on its upper surface by a bridge-like member 52. Part 54 is secured to the lower front edge of the camper and consists of L-shaped member 56 having a vertically extending portion 58 and a generally horizontally extending portion 60. The vertical portion is provided with holes 62, 64 and 66 for receiving bolts or screws for securing part 54 to the camper. An elongated member 68 is secured to the underside of member 56 and is preferably joined thereto by welding or any other suitable securing means. Portion 60 is tapered inwardly in a generally frusto-conical shape and is adapted to slide easily into slot 50 of part 44. With part 54 mounted on the lower corners of the camper and with part 44 secured to the truck bed at the front thereof in alignment with part 54, the camper is pushed forwardly in the bed until the portion 60 is firmly seated in slot 50 with the curved section 70 seating firmly against the lower adjacent corner of member 52, thus wedging the corner into the slot and holding the two parts firmly and rigidly together.

Figure 8:
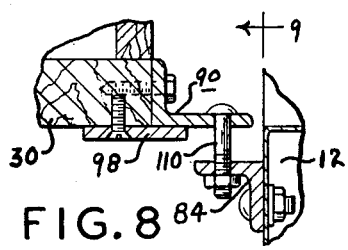
FIGURE 8 is a vertical cross sectional view, taken on line 8—8 of FIGURE 2.
Figure 9:
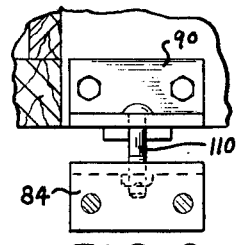
FIGURE 9 is an elevational view of the fixture shown in FIGURES 7 and 8 illustrating the manner in which it is mounted on the truck and attached to the pick-up camper.
Figure 6:
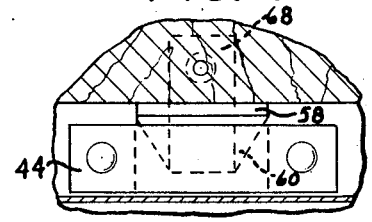
FIGURE 6 is a top plan view of the fixture shown in FIGURES 3 and 4 and a fragmentary cross sectional view of the camper and truck.
Figures 4, 5:
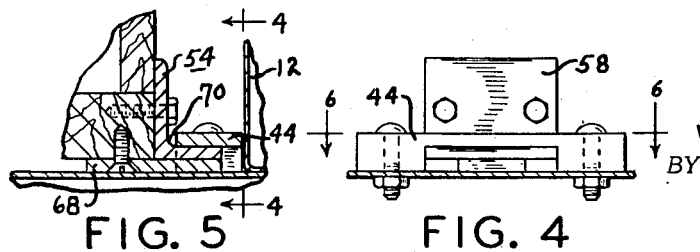
FIGURE 4 is an elevational view of the fixture shown in FIGURE 3, illustrating the manner in which it is bolted onto the bed of a truck.
FIGURE 5 is a vertical cross sectional view of the fixture shown in FIGURES 3 and 4, the section being taken on line 5—5 of FIGURE 2.

Mounted on the read of the truck and on the inside wall of extension 30 of the camper are fixtures 80 and 82, each consisting of a lower bracket 84 secured to the rear end of the truck bed by bolts extending through holes 86 and 88, and part 90 secured to the lower inside corner of projection 30 by bolts extending through holes 92, 94 and through a hole 96 in a member 98 secured to the underside of L-shaped portion 100. Portion 100 of part 90 and portion 104 of part 84 contain holes 106 and 108, respectively, for receiving a bolt 110. With the two parts 84 and 90 mounted in the position illustrated in FIGURES 8 and 9, the bolt 110 draws the rear end of the camper downwardly, seating it firmly on the bottom of bed 12, thus holding parts 44 and 54 in interlocked position as illustrated in FIGURES 4, 5 and 6, and holding the rear end of the camper firmly in place.

In mounting the present camper hold-down means, parts 44 of fixtures 40 and 42 are bolted to the bottom of the bed at the front end thereof and parts 54 of the same fixtures are secured to the lower front corners of the camper in alignment with slots 50 in the respective part 44. Parts 84 of fixtures 80 and 82 are secured to the rear end of the truck bed, and parts 90 are secured to the lower front corners of projection 30. The camper is then mounted on the bed and slid forwardly until the portion 60 of part 54 seats firmly in slot 50, with curved section 70 firmly engaging the adjacent lower edge of member 52, thus firmly holding the forward end of the camper in place. The bolts are then inserted through holes 106 and 108 of the two fixtures 80 and 82 and tightened, thereby drawing the rear end downwardly and holding the camper in a fixed position. Since the four fixtures 40, 42, 80 and 82 are rigidly secured to relatively strong structural members of the vehicle and camper, the fixtures effectively retain the camper rigidly and safely in place in the bed throughout all normal operating conditions of the vehicle, without the necessity of periodic tightening of the bolts or screws of the fixture parts to the truck and camper.

Various changes and modifications in the present hold-down means can be made, and one fixture such as 40 or 42 may be used at the forward end of the camper and bed, or a greater number than two may be used if desired. Further changes and modifications may be made without departing from the scope of the invention.

I claim:
1. A camper hold-down means for use with a pick-up truck bed, said camper having a lower front corner: said means comprising a fixture having a part with a horizontal slot therein, means for securing said part to the bottom of the bed at the front thereof, and a second part having a horizontal projection for seating in the slot in said first part, means for securing said second part adjacent the lower front corner of the camper with said projection in substantial alignment with the slot in said first part, a fixture having an upper part for mounting near the rear of the camper and a lower part for mounting at the rear of the bed and lower than said first mentioned rear part, and an adjustable means for urging said upper and lower parts toward one another to hold down the rear end of the camper and prevent longitudinal movement of the camper.

2. A camper hold-down means as defined in claim 1 in which the horizontal projection on the second part of the first mentioned fixture is tapered inwardly along its two sides toward the forward end.

3. A camper hold-down means as defined in claim 1 in which the second part of said first fixture has an upwardly extending front plate and an arcuate section connecting the projection and said plate, said arcuate section engaging and seating firmly on the adjacent edge of said first member above said slot.

4. A camper hold-down means as defined in claim 2 in which the second part of said first fixture has an upwardly extending front plate and an arcuate section connecting the projection and said plate, said arcuate section engaging and seating firmly on the adjacent edge of said first member above said slot.

5. A camper hold-down means as defined in claim 1 in which two of said first mentioned fixtures are positioned in spaced relation along the lower front corner of the camper and in the forward end of the bed.

6. A camper hold-down means as defined in claim 4 in which two of said first mentioned fixtures are positioned in spaced relation along the lower front corner of the camper and in the forward end of the bed.

7. A camper hold-down means as defined in claim 1 in which the upper part of said last mentioned fixture includes an L-shaped horizontal portion with a hole therein, and lower part of said fixture includes a horizontal portion with a hole therein, and a bolt extends through the holes in said horizontal parts and contains a nut for drawing said horizontal parts toward one another.

8. A camper hold-down means as defined in claim 1 in which two of said second mentioned fixtures are mounted in spaced relation on the camper and truck bed adjacent the rear thereof.

9. A camper hold-down means as defined in claim 7 in which two of said second mentioned fixtures are mounted in spaced relation on the camper and truck bed adjacent the rear thereof.

10. A camper hold-down means as defined in claim 6 in which two of said second mentioned fixtures are mounted in spaced relation on the camper and truck bed adjacent the rear thereof.

References Cited
UNITED STATES PATENTS 3,368,785   2/1968   Weiler _____ 296—23
3,130,688   4/1964   Gutridge _____ 296—35.1

PHILIP GOODMAN, Primary Examiner

U.S. Cl. X.R.

248—361